UNITED STATES PATENT OFFICE.

JOHANN HEINRICH CARL BEHNKE, OF HAMBURG, ASSIGNOR OF ONE-HALF TO THE CHEMISCHE FABRIK IN BILLWÄRDER, VORMALS HELL & STHAMER, A. G., OF BILLWÄRDER, GERMANY.

PROCESS OF AND APPARATUS FOR MAKING CARBON DIOXID.

SPECIFICATION forming part of Letters Patent No. 551,485, dated December 17, 1895.

Application filed August 25, 1892. Serial No. 444,045. (No model.)

*To all whom it may concern:*

Be it known that I, JOHANN HEINRICH CARL BEHNKE, a subject of the German Emperor, residing at Hamburg, Germany, have invented certain new and useful Improvements in Producing Pure Carbonic Acid, of which the following is a specification.

My invention has relation to improvements in the production of pure carbonic-acid gas from the gases evolved in lime and other carbonic-acid gas-producing kilns, as well as from the products of combustion of carbonaceous materials by causing such gases to be absorbed by an alkali carbonate solution under gradually-decreasing pressures and by separating the pure carbonic-acid gas from the bicarbonate solution by distillation or vaporization at a gradually-decreasing pressure.

My said invention consists, therefore, in a novel process of and in apparatus for producing pure carbonic-acid gas, as will now be fully described, reference being had to the accompanying drawings, in which—

Figure 1:
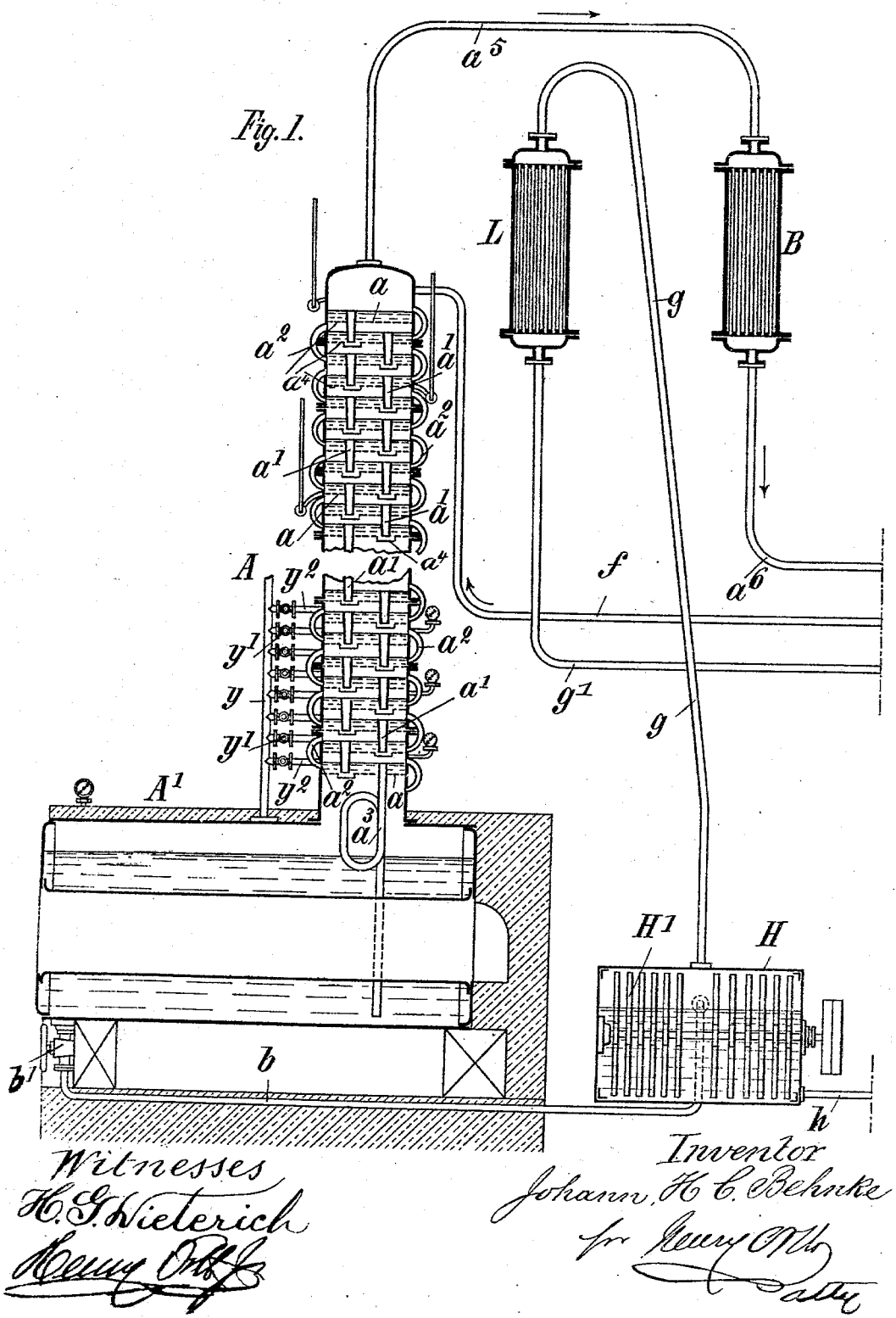
Figure 2:
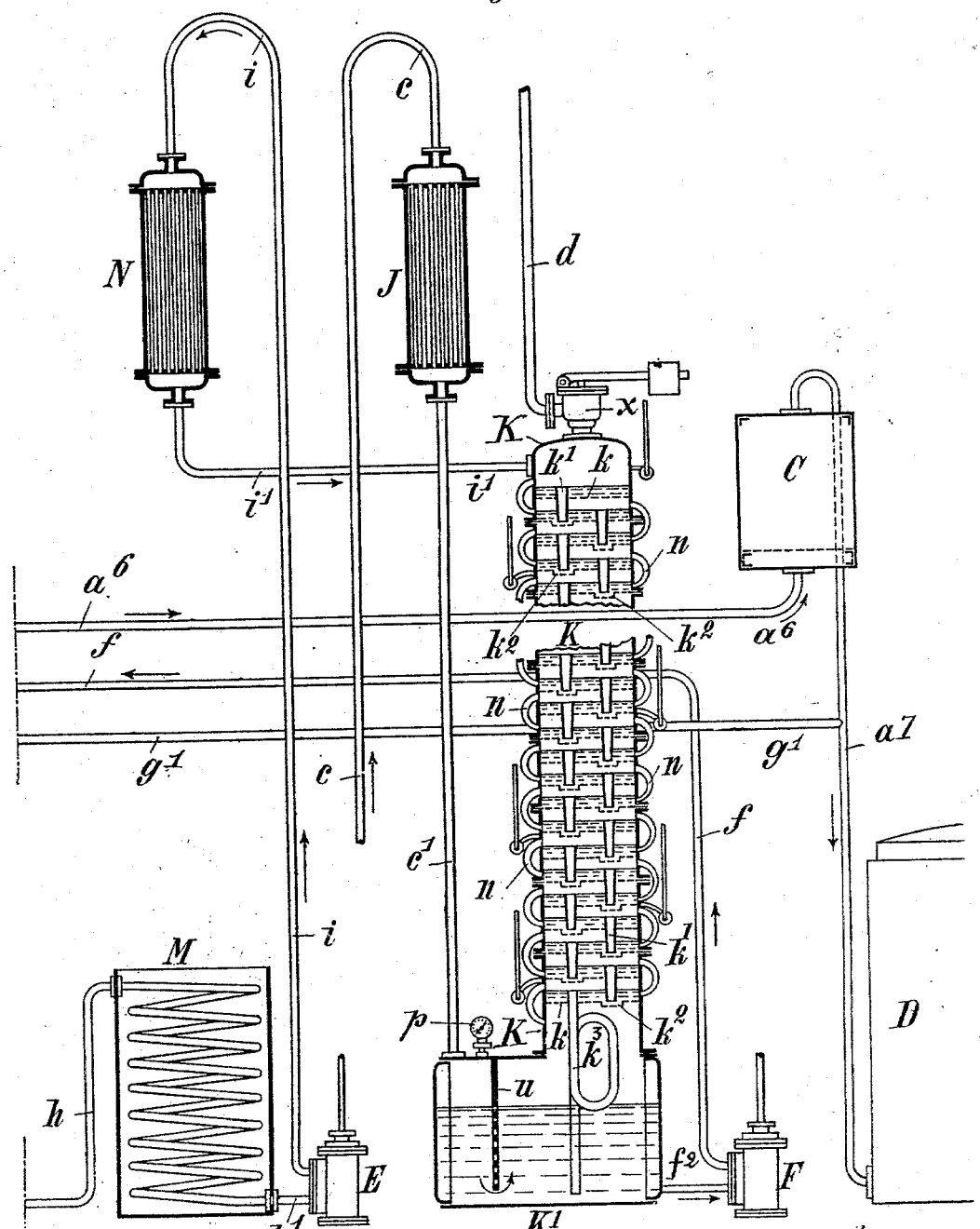

Figures 1 and 2 show by vertical sectional elevations an apparatus for carrying out the process.

In said drawings, $c$ indicates the carbonic-acid-gas supply-pipe that is connected on the one hand with the source of gas-supply, and on the other with the inlet of a suitable cooler, as a multitubular or surface cooler J, whose outlet is connected by a pipe $c'$ with a receiver or vessel K', so as to discharge the gas into the upper part of said receiver, at one end thereof. A partition $u$, arranged in proximity to the gas-inlet and extending from the top nearly to the bottom of the receiver K', is perforated for a portion of its length from the lower edge upwardly, so that when said receiver K' is filled with a solution of an alkali carbonate to a point above the upper rows of perforations the entering gas is compelled to flow through the solution on the inlet side of the partition $u$, thence under and through the perforations of the latter into the solution on the opposite side of the said partition, and finally to the upper or gas space of the holder, whereby a portion of the carbonic-acid gas entering the receiver is absorbed.

On the receiver K' is arranged an absorption-column K, divided into a series of superposed compartments by means of perforated partitions $k$, in each of which is formed a depression or well $k^2$, into which dips the lower tapering end of an overflow-pipe $k'$, secured to the partition immediately above, in lieu of which external overflow-pipes $n$ may be provided, whose outlet is also of less cross-sectional area than the inlet thereof, or, if desired, both the overflow-pipes $k$ and $n$ can be used, a siphon-pipe $k^3$ being connected to the lowermost foraminous partition $k$, whose outlet is proximate to the bottom of the receiver K'. Suitable means are of course provided to introduce a first charge of solution into said receiver, as well as a pressure-indicator $p$ on the gas-inlet side of the partition $u$. At its upper end the column K is provided with a pressure-regulating valve of well-known construction, whose valve-casing $x$ is in communication with the atmosphere through a pipe $d$. The suction-port of a pump F is connected with the receiver K' near its bottom by a pipe $f^2$, and the discharge of said pump is connected by a pipe $f$ with the upper end of a distilling or vaporizing column A of exactly the same construction as the absorption-column K, $a$ indicating the foraminous partition, $a^4$ the depression or well therein, $a'$ $a^2$ the overflow-pipes, and $a^3$ the siphon-pipe. The upper end of said column A is also connected by a pipe $a^5$ with the inlet of a cooler B whose outlet is connected by a pipe $a^6$ with a filter C that is connected by a pipe $a^7$ with a gas-holder D, said pipe $a^7$ being connected by a branch pipe $g'$ with a cooler L whose inlet is connected by a pipe $g$ with a vessel H in which is arranged a revoluble agitator H'. The vessel H is connected by a pipe $b$ provided with a suitable valve or stop-cock $b'$ with a boiler A', to which the lower end of the distilling and vaporizing column A is connected and into which the outlet of the siphon-pipe $a^3$ dips, and the said vessel H is connected by pipe $h$ with one end of a cooling-coil M, the other end of which is connected by a pipe $h'$ with the suction-port of a pump E, the discharge of said pump being connected by pipe $i$ with the inlet of a cooler N, whose outlet is connected by pipe $i'$ with the upper end of column K.

In carrying out my process the receiver K' is charged with a solution of an alkaline carbonate, gas from a producer being admitted to cooler J through pipe $c$ and through pipe $c'$ to said receiver, the said gas being absorbed by the monocarbonate solution, thereby converting the latter into a bicarbonate solution which is pumped by pump F into the upper end of the distilling or vaporizing column A, gradually flowing down the same into boiler A', wherein it is heated sufficiently to liberate the carbonic acid, which together with the steam generated ascends the said column, the steam being condensed while the carbonic-acid gas passes to cooler B, filter C, and thence to holder D through pipe connection $a^5$, $a^6$ and $a^7$ respectively. The solution in boiler A' substantially deprived of its carbonic-acid gas and thereby reconverted into a monocarbonate solution is drawn by pump E into vessel H, the agitator H' expelling such carbonic-acid gas as is held mechanically by the solution, the gas passing to cooler L and thence directly to holder D through the pipe connections $g$ $g'$ $a^7$.

The monocarbonate solution, or solution substantially free from available carbonic-acid gas, is drawn from vessel H by pump E and forced through cooler N into the top of the absorption-column K, trickling downwardly from partition to partition in opposition to the upwardly-flowing gas back into the receiver K', from whence it is returned to column A, thus effecting a continuous flow of the liquid through the apparatus.

It is evident that the monocarbonate solution passes from the upper to the lower partition in column K in a finely-subdivided condition, so that substantially every drop of solution is brought in contact with the ascending gas, whereby the latter is rapidly absorbed. The permanent gases not absorbed by the carbonate solution can escape through the pressure-regulating valve whenever the pressure exerted by said gases in the upper end of the column exceeds that exerted by the weight on said valve, so that the pressure in the column K can be regulated to that which is most advantageous to the absorption of the carbonic-acid gas.

The number and area of the perforations in the partitions $k$ in column K and of those $a$ in column A, which perforations are preferably conical, are so chosen that under the pressure existing in said columns the said partitions will at all times be covered with a stratum of carbonate or bicarbonate solution respectively. This is of importance, not only in that the absorption of the carbonic-acid gas is effected more rapidly under pressure, but in that the depth of the stratum of solution on the partition depends upon the said pressure, and as the latter is necessarily a gradually-decreasing one in an upward direction the pressure at the upper end of the column K can be readily controlled and adjusted nearly to atmospheric pressure. The same state of affairs exists in the distilling or vaporizing column A, the cold or substantially cold solution—i. e., the solution of alkaline carbonate saturated with carbonic-acid gas—as it trickles down from partition to partition is gradually heated, so that the bicarbonate solution when it reaches the boiler requires but little more heat to bring it to the temperature at which it will give up the carbonic-acid gas, while the steam ascending with the latter gas coming in contact with the colder solution will be condensed and returned to the boiler A'. It is clear that the pressure in the column A also gradually decreases in an upward direction, since the difference between the pressures at the foot and upper end respectively of said column is equal to the sum of the strata of solution on the partitions $a$.

As hereinabove stated the passage through the overflow-pipes $a'$ $a^2$ or $k'$ $n$ is gradually reduced from the inlet to the outlet; but in order to avoid the luting or closing of the inlet of said overflow-pipes and thereby causing the level of the liquid on the partitions $a$ or $k$ to rise abnormally and correspondingly increase the pressure in the various compartments the outlet of said pipes must be of such a cross-sectional area as to allow all of the solution supplied to the columns K and A through pipes $i$ and $f$, over and above a certain portion held on the partitions and that portion flowing directly through the perforations of said partitions, to flow through said overflow-pipes from one partition to another and finally into the receiver K' and boiler A', respectively, so that the depth of the stratum of solution on the aforesaid partitions is made dependent upon the difference in the pressure at different points in the columns A and K.

In order that the pressure in the individual compartments of the column A may be adjusted, I provide a pipe $y$ extending from and communicating with the vapor-space of the boiler A', to which pipe are connected branches $y^2$ leading into said compartments and provided each with a stop-cock $y'$, whereby vapor or gas from the boiler is admitted directly to said compartments, each of which is provided with a pressure-indicator, as shown, at the lower portion of the column A. Such an arrangement is preferably also provided for column K. Suitable level-indicators (not shown) are also provided, so that the conditions of pressure and level of liquid in the compartments can be readily observed and the supply of solution to the columns regulated, in order that the process may be properly carried out.

I am aware that prior to my invention it has been proposed to produce pure carbonic-acid gas from the products of combustion of carbonaceous materials, and other carbonicacid-gas products by causing the carbonic-acid constituents to be absorbed by an alkali carbonate, and by subsequently liberating the said gas from its absorbent by heat, in that the saturated or bicarbonate solution is first heated under normal pressure or no pressure, and then heated under pressure, the waste products of combustion in the latter process being utilized for preheating the solution, and I do not desire to claim such process or processes herein; but What I do claim is—

1. In the production of pure carbonic acid gas from gases evolved in the manufacture of lime or other carbonic acid gas producing substances, the improvement which consists in bringing the gases in contact with a liquid absorbent, as a solution of an alkali carbonate, driving out the absorbed carbonic acid gas by heat, and causing the mixture of steam and gas to flow in opposition to a similar cold solution saturated with carbonic acid under a pressure gradually diminishing in the direction of flow of said mixture of gas and steam, for the purpose set forth.

2. In the production of pure carbonic acid gas from gases evolved in the manufacture of lime or other carbonic acid gas producing substances, the improvement which consists in causing the gases to flow in opposition to a finely divided liquid absorbent as a solution of an alkali carbonate, effecting the absorption under a pressure diminishing in the direction of flow of the gases, driving the absorbed carbonic acid gas out of the saturated or bi-carbonate solution by means of heat, cooling the monocarbonate solution so obtained and causing the carbonic acid driven out to flow in opposition to a cooled saturated or bi-carbonate solution under a pressure diminishing in the direction of flow of the gas, for the purpose set forth.

3. In an apparatus for producing carbonic acid, the combination with the receiver K', its column K, the boiler A', its column A, and means for admitting gas to receiver K' and for conveying liquid therefrom to the upper end of column A; of a vessel, as H, provided with an agitator, and means for transferring liquid from said boiler A' to the vessel H and from the latter to the receiver K', substantially as and for the purpose set forth.

4. In an apparatus for producing carbonic acid, the combination with the vessel K', its column K, the boiler A', its column A, and means for admitting gas to said receiver K' and for conveying liquid therefrom to the upper end of column A, of a vessel, as H, an agitator therein, a cooler, as M, a pump, as E, a cooler, as N, and suitable pipes connecting the vessel H with the boiler and cooler respectively, the pump E with said cooler, and the cooler N, respectively, and the latter with the upper end of column K, substantially as and for the purpose set forth.

5. In an apparatus for producing carbonic acid, a column divided into a series of superposed compartments by foraminous partitions, overflow pipes leading from one partition to the next below, and a pressure regulating valve at the upper end of said column, in combination with a receiver at the foot of the column, and means for admitting gas to said receiver and liquid to the column at its upper end, substantially as and for the purpose set forth.

6. In an apparatus for producing carbonic acid, the combination with a column divided by foraminous partitions into superposed compartments, overflow pipes leading from one compartment into the next below, and means for admitting gas at the foot of the column and liquid at the head thereof, of pressure regulating devices comprising a pipe connected with the gas supply, and valved branches connected each with one of the compartments in the column, substantially as and for the purpose set forth.

In testimony that I claim the foregoing as my invention I have signed my name, in presence of two witnesses, this 1st day of August, 1892.

JOHANN HEINRICH CARL BEHNKE.

Witnesses:
ALEXANDER SPECHT,
H. F. W. GREBHE.